United States Patent [19]

Charles

[11] Patent Number: 4,625,161
[45] Date of Patent: Nov. 25, 1986

[54] CONTROL PULSE GENERATOR FOR THYRISTORS SUPPLYING A REACTIVE POWER REGULATING INDUCTOR IN AN ELECTRICAL POWER NETWORK

[75] Inventor: Patrick Charles, Mareil sur Mauldre, France

[73] Assignee: Cgee Alsthom, France

[21] Appl. No.: 691,810

[22] Filed: Jan. 16, 1985

[30] Foreign Application Priority Data

Mar. 13, 1984 [FR] France .................................. 84 03837

[51] Int. Cl.$^4$ .............................................. G05F 1/70
[52] U.S. Cl. ..................................... 323/210; 323/211
[58] Field of Search ................................. 323/210, 211

[56] References Cited

U.S. PATENT DOCUMENTS

| | | | |
|---|---|---|---|
| 3,703,680 | 11/1972 | Frank et al. | 323/210 |
| 4,143,315 | 3/1979 | Kelley, Jr. | 323/210 |
| 4,289,951 | 9/1981 | Jurek | 323/211 X |
| 4,292,545 | 9/1981 | Hingorani | 323/210 X |
| 4,451,777 | 5/1984 | Gyugyi | 323/210 |

Primary Examiner—Patrick R. Salce
Assistant Examiner—Marc S. Hoff
Attorney, Agent, or Firm—Sughrue, Mion, Zinn, Macpeak and Seas

[57] ABSTRACT

The thyristor control pulse generator consists of a dual slope sawtooth signal generator (11, 13, 17) providing a signal $U_{sy}$ with slopes a and $2a$, said sawtooth generator comprising an input (23) for resetting the signal to zero in response to each generated pulse $\theta$ and means (15) for controlling the switching of the signal slope from value a to value $2a$ at the time the current in the reactive power regulating inductor becomes cancelled. A comparator (19) compares said signal $U_{sy}$ to a control voltage $U\alpha$ to which a correcting signal $\Delta U\alpha$ is added in a summing circuit (21), which correcting signal is developed from the means value of the current i in the inductor, given by an integrator (36) receiving at its input an image of said current, said image being taken from the output of another integrator (24) which receives the image U of the voltage across the terminals of the inductor at its input and includes a circuit (26 to 33) for resetting and holding its output to zero when no current is flowing in the inductor. The output of the comparator (19) is connected to a pulse converter (22) which outputs the thyristor firing pulses $\theta$.

3 Claims, 5 Drawing Figures

CONTROL PULSE GENERATOR FOR THYRISTORS SUPPLYING A REACTIVE POWER REGULATING INDUCTOR IN AN ELECTRICAL POWER NETWORK

This invention concerns a control pulse generator for thyristors supplying a reactive power regulating inductor in an electrical power network.

Such regulation is known to be provided by the variable time of passage of the current in the inductor, which depends on the firing angle $\alpha$ of the thyristors, the origin of said angle $\alpha$ being the voltage's zero crossing.

One known method of triggering the control pulses involves the use of a control signal $U\alpha$ proportional to the firing angle $\alpha$ which is compared with a sawtooth signal $U_{sy}$ obtained by integrating a constant voltage, the triggering of integration being synchronized by each voltage zero crossing.

A pulse is sent to the thyristor each time $U_{sy} = U\alpha$.

This approach was described in two papers published in the context of the International Symposium on Controlled Reactive Power Compensation held in Montreal, Sept. 19 to 21, 1979, jointly sponsored by Hydro-Quebec and the Electric Power Research Institute, one by Pierre Pelletier and Omer Bourgault, entitled "Courts-circuits au Poste Rimouski à 230 kV et comportement du compensateur statique de type à inductance contrôlée par thyristor," and the other by Jean Béranger, Luiz Eduardo Nora Dias, Sergio de Azevedo Moraes and Sergio de Oliveria Frontin entitled, "Application of a Static Var System on the Furnas 138 kV Transmission Network in Brazil."

This approach nevertheless involves some disadvantages. Namely, as the triggering of integration is synchronized with each voltage zero crossing, this can result in several thyristor control pulses being sent at uncontrolled times if the voltage itself contains irregularities such as erratic zero crossings in the course of a half-cycle.

Also, in the presence of even harmonic voltages superimposed on the supply voltage, the firing angles $\alpha$ tend to deviate from the reference value between the positive and negative half-waves, thus producing even harmonic currents together with a DC component.

Such currents can generate other even harmonics through power supply impedance which under certain conditions lead to unstable operation.

One solution to these disadvantages is to provide a pulse generator synchronized to the current rather than the voltage, as described in the paper entitled, "Thyristor and Variable Static Equipment for AC and DC Transmission," presented to the international conference in London, Nov. 30 to Dec. 3, 1981, organized by "The Power Division of the Institution of Electrical Engineers."

According to this device, integration of a constant voltage is triggered, not by each zero crossing of the voltage, but instead by each outputting of a control pulse for the thyristors. When the current cancels in the thyristors, the integration slope is doubled such that a double constant voltage is integrated. This yields a sawtooth which is superimposed on the sawtooth which would be produced as previously described by integration of a same constant with the said double value and whose triggering is synchronized by the zero voltage crossing.

Accordingly, as long as current is flowing in the thyristors, i.e. during the conduction angle $\sigma$, the slope of the sawtooth signal is half-valued. This angle $\sigma$ is tied to the firing angle $\alpha$ according to the following relation: $\sigma/2 = \pi - \alpha$.

FIGS. 1A, 1B and 1C of the accompanying drawings illustrate this approach.

FIG. 1A shows the voltage U across the terminals of the regulating inductor and the current i flowing through this inductor. The firing angle of the inductor-feeding thyristors is defined by the angle $\alpha$ whose origin is the zero crossing of voltage U.

It is apparent from the figure that the conduction time is such that $\sigma/2 = \pi - \alpha$.

Figure 1A:
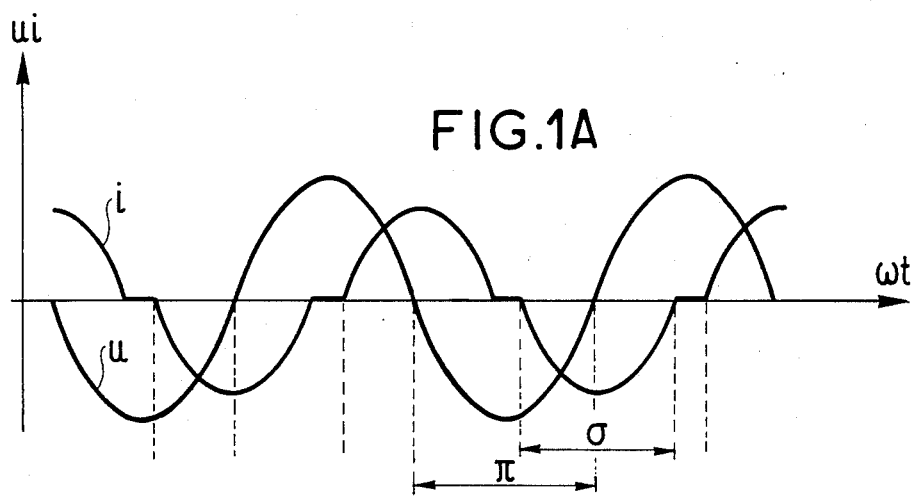
FIG. 1B shows the sawtooth signal $U_{sy}$ used in conjunction with the control signal $U\alpha$, proportional to the desired firing angle $\alpha$ to determine the pulse times.
FIG. 1C shows the firing pulses $\theta$.

Taken together, these three figures make it apparent that the signal $U_{sy}$, which is the integration of a constant voltage, is triggered each time a thyristor firing pulse $\theta$ is given, and that when the current i disappears, the slope of signal $U_{sy}$ doubles, thus superimposing this part of signal $U_{sy}$ on a sawtooth phantom signal that would be synchronized with the zero crossings of the voltage.

Such a technique makes it possible to preserve device accuracy, even under disturbed voltage conditions, because voltage zero crossings can no longer cause loss of synchronization through erratic rezeroing of signal $U_{sy}$. In this technique, the current is measured using a current transformer.

The above technique is still not entirely satisfactory however, because it makes it necessary to detect the presence or absence of a current to control changing of the integration slope. Since even a slight aperiodic component in the current offsets the firing and turn-off times unsymmetrically, operation is unstable.

The present invention is directed to obviating this latter drawback. It provides an improved thyristor control pulse generator for thyristors supplying a reactive power regulating inductor in an electrical power network, said inductor being connected to the network via a thyristor-controlled two-way static switch, said pulse generator comprising a sawtooth signal generator output connected to one input of a comparator the other input whereof receives a control signal for varying the firing angle of the thyristors, the output of said comparator being connected to a circuit for generating said thyristor control pulses, the output of said circuit being connected both to the thyristors' gates and to a sawtooth signal generator zero reset input, said latter generator including means of generating a signal of slope a or 2a, switching between a and 2a-sloped signals being controlled by the disappearance of current from said inductor, said thyristor control pulse generator wherein a circuit is provided to develop an image of the current in said inductor, said image being based on a voltage U being itself an image of the voltage across the terminals of the inductor which is fed to an integrator having an output connected to an integrator resetting signal generator, driven by the output signal of said comparator, and wherein the output of said integrator is also connected to a circuit establishing the mean value of said current, the output of said latter circuit being connected on the one hand directly to one of the inputs of a two-input selector switch with a single, common output and on the other hand to the other selector switch input via an inverter, the selector switch inverter control being connected to the input of the voltage U integrator, the sign change of voltage U alternately causing switching to one, then the other of the two inputs to said selector switch whose output drives one of the two inputs of a summing circuit, the other input whereof receives a firing angle α control voltage Uα and the output whereof constitutes said control signal for varying said firing angle, going to said comparator.

The invention thus utilizes the prior art technique briefly described hereinabove, and improves upon it by computing the mean value of the current, which is to say its direct component, and carrying out a positive or negative correction Δα of the firing angle around the reference during one alternation and a −Δα correction during the next alternation. In steady state conditions, this correction signal is theoretically null. It appears only during certain transient conditions, especially when the voltage includes even harmonic components. Accordingly, one can no longer use a current transformer as in the prior art, since it is now necessary to have a true image of the current for the purpose of calculating its mean value and a current transformer would cancel any direct component at its secondary.

In one embodiment of the invention, said integrator reset signal generator comprises one positive threshold detector and one negative threshold detector connected in parallel, the output of the positive threshold detector being connected to the R input of a first RS type flip-flop and the output of the negative threshold detector being connected to the R input of a second RS flip-flop, the S input of each flip-flop being connected to the output of said comparator and the Q output of each flip-flop being connected respectively to each of the two inputs of a NOR logic circuit whose output constitutes said zero reset signal.

Preferably, said dual slope sawtooth signal generator comprises a constant voltage power supply supplying a first input of a summing circuit, on the one hand, and, via a controlled cutoff switch on the other hand, supplying a second input of said summing circuit the output whereof is connected to the input of an integrator outputting said sawtooth signals.

Figure 1B:
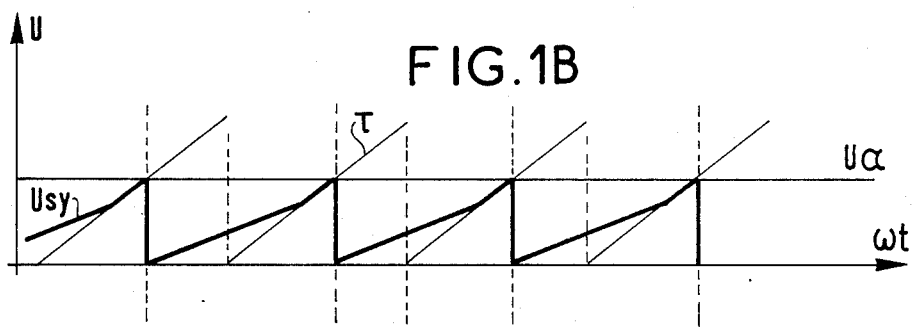
Figure 1C:
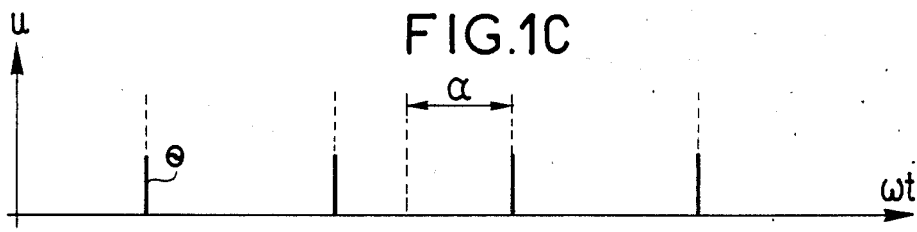
Figure 2:
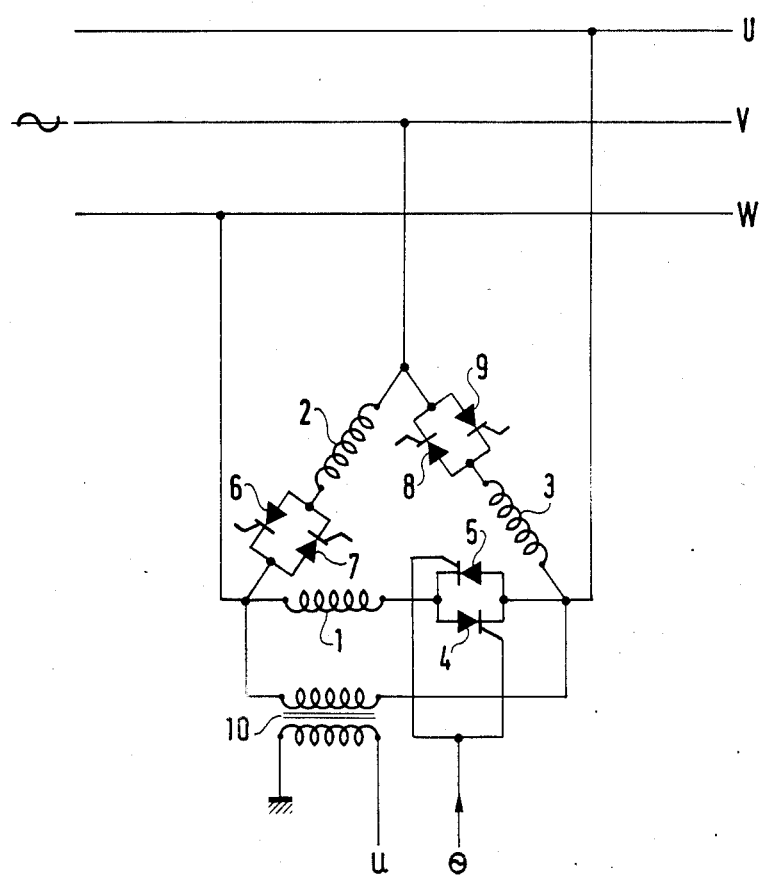
Figure 3:
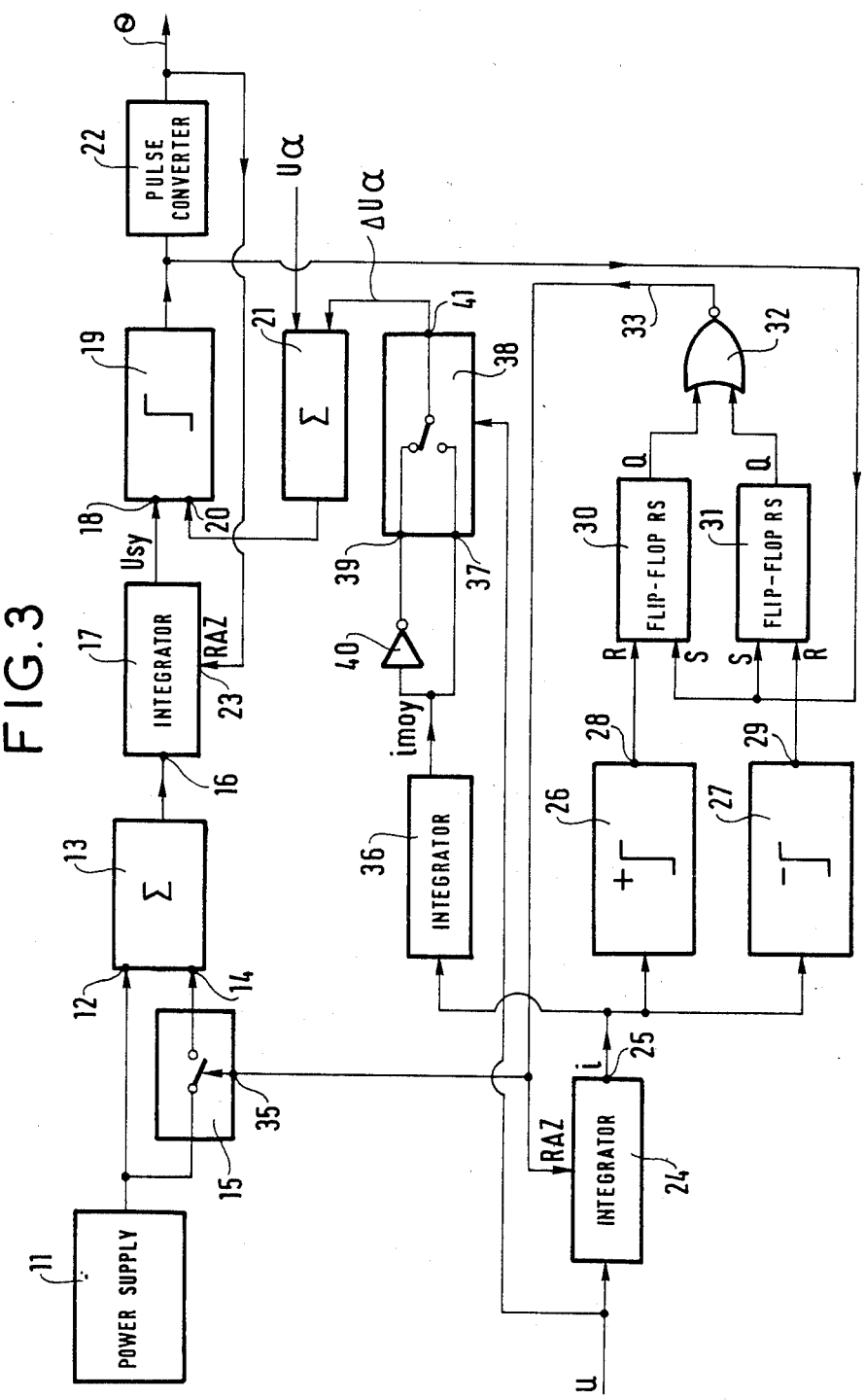

The various features and advantages of the invention will be more readily understood in reading the following description of one embodiment thereof, with reference to the accompanying drawings in which:

FIGS. 1A, 1B and 1C provide a graphic representation of the technique employed. These figures were described in discussing the prior art, but they also apply to the invention, which makes use of the same technique, albeit adding a correction to the control voltage Uα and creating a real image of the current i in the inductor;

FIG. 2 represents a 3-phase line having an inductor-type compensator connected thereto, with said inductors supplied from two-way thyristor controlled static switches; and FIG. 3 is a block diagram of the device according to the invention for controlling the firing pulses for the thyristors of the inductor of one of the phases of the compensator according to FIG. 2.

Referring first to FIG. 2, a 3-phase network U, V, W is shown, having a compensator connected thereto consisting of inductors 1, 2 and 3 arranged in a delta configuration.

Each inductor is supplied via a two-way, thyristor-controlled static switch: thyristors 4 and 5 controlling inductor 1, thyristors 6 and 7 controlling inductor 2 and thyristors 8 and 9 controlling inductor 3.

A potential transformer 10 is connected between the U and W phases such as to obtain voltage U across the terminals of the inductor 1. The pulses $\theta$ illustrated in FIG. 1C are sent to the gates of thyristors 4 and 5.

Said pulses are generated by the device depicted in FIG. 3. Two other identical devices also enable sending the firing pulses of the switches for inductors 2 and 3 respectively, based upon their respective voltages.

The device according to the invention, diagrammed in FIG. 3, comprises a regulated, constant voltage power supply 11 whose output is connected to a first input 12 of a summing circuit 13. The output of power supply 11 is also connected to the second input 14 of summing circuit 13 via a control switch 15. Circuit 13 thus outputs a signal either equal to the signal leaving the power supply 11, if switch 15 is open, or double said signal if said switch is closed. This enables a ramped signal $U_{sy}$ of slope a or 2a to be obtained at the output of an integrator 17, by applying the signal from circuit 13 to the input 16 of said integrator 17.

This signal $U_{sy}$ is sent to an input 18 of a comparator 19 whose other input 20 receives a control signal for varying the firing angle of thyristors 4 and 5; the latter signal being equal to the firing angle α control signal Uα, plus an error correction signal ΔUα whose development will be described hereinafter. A summing circuit 21 sums these two signals Uα and ΔUα. When $U_{sy}$ equals signal Uα+ΔUα, the comparator 19 outputs a signal to a pulse converter 22 the output whereof is connected to the gates of thyristors 3 and 4 and supplies the pulses $\theta$ shown in FIG. 1C.

The output of pulse converter 22 is also connected to an integrator 17 zero reset input 23. Accordingly, signal $U_{sy}$ is reset at each outputting of pulses, or otherwise stated, at the beginning of the conducting phase of either of thyristors 4 and 5.

The device further comprises a circuit for producing an image of the current in inductor 1. This circuit on the one hand enables development of the error correction signal ΔUα and on the other hand enables control of switch 15.

Said current imaging circuit includes an integrator 24 receiving a voltage U input from the potential transformer 10 (FIG. 2). Its output 25 is connected to an integrator 24 zero reset circuit. It also includes a positive threshold detector 26 and a negative threshold detector 27 connected in parallel to output 25, the respective outputs 28 and 29 of said detectors being connected to the R inputs of RS flip-flops 30 and 31 respectively. The positive and negative threshold detectors 26 and 27 are set for a very low, respectively positive and negative voltage ε.

The Q outputs of flip-flops 30 and 31 are connected to the two inputs of a NOR gate 32 whose output 33 is connected to an integrator reset input 34. The S input of flip-flops 30 and 31 is controlled by the output of comparator 19. It is thus possible with this device to obtain, at the output 25 of the integrator 24, an accurate image of the current i in the inductor 1 along with any direct component which may be present.

Lacking any current in the inductor, the Q outputs of the flip-flops 30 and 31 go to logic 0 such that the output 33 of the NOR gate goes to logic 1, thus maintaining integrator 24 at zero until the next pulse $\theta$ which, when applied to the input 5 of the flip-flops 30 and 31, forces their output Q to a logic 1 and thus the NOR gate output to 0, again allowing integration of the voltage U.

In order to reset the output of the two flip-flops as the current breaks down, the positive and negative threshold detectors 26 and 27 are not set to zero, but instead to a very low value, ie. to $+\epsilon$ and $-\epsilon$ respectively. The integrator zero reset signal is also sent to an input 35 for controlling switch 15. When this input 35 receives a binary signal equal to 1, ie. corresponding to the breakdown of the inductor current, switch 15 closes, thus doubling the slope of signal $U_{sy}$ (FIG. 1B). When the control signal goes to zero, the switch opens and the slope of signal $U_{sy}$ resumes a half value.

Finally, the output 25 of the integrator 24 providing an image of current i is connected to a circuit developing an error correcting signal $\Delta U\alpha$ so as to drive the direct component of the current to zero.

This circuit consists of an integrator 36 which outputs a signal corresponding to the mean value $i_{moy}$ of current i.

The output of integrator 36 is connected on the one hand to a first input 37 of a two-input switch 38 and on the other hand to the second input 39 of the same switch 38 via an invertor circuit 40. The switch's common output 41 routes the correction signal $\Delta U\alpha$ to one of the two inputs of summing circuit 21 whose other input receives the firing angle $\alpha$ control voltage $U\alpha$ for the thyristors 4 and 5.

The device according to the invention enables excellent results to be obtained, even with disturbed voltages.

I claim:

1. Control pulse generator for thyristors supplying a reactive power regulating inductor in an electrical power network, said inductor being connected to the network via a thyristor-controlled two-way static switch, said pulse generator comprising a sawtooth signal generator having an output connected to one input of a comparator, said comparator having another input which receives a control signal for varying the firing angle of the thyristors, the output of said comparator being connected to a circuit for generating said thyristor control pulses, the output of said circuit being connected both to the thyristors' gates and to a sawtooth signal generator zero reset input, said sawtooth signal generator including means for generating a signal of slope a or 2a, switching between a 2a-sloped signals being controlled by the disappearance of current from said inductor, said thyristor control pulse generator circuit developing an image of the current in said inductor, said image being based upon a voltage U being itself an image of the voltage across the terminals of the inductor which is fed to an integrator having an output connected to an integrator reset signal generator, driven by the output signal from said comparator, and wherein the output of said integrator is also connected to a circuit estatlishing the mean value of said current, the output of said latter circuit being connected directly to one of the inputs of a two-input switch with a single, common output and to the other input of the same switch via an invertor defining an inversion control for said switch and being connected to the input of a voltage U integrator, the sign change of voltage U alternately causing switching to one, then the other of the two inputs to said switch whose output drives one of the two inputs of a summing circuit, the other input of said summing circuit receiving a firing angle $\alpha$ control voltage $U\alpha$ and the output of said summing circuit constituting said control signal for varying said firing angle, going to said comparator.

2. A control pulse generator according to claim 1, wherein said integrator reset signal generator comprises one positive threshold detector and one negative threshold detector connected in parallel, the output of the positive threshold detector being connected to the R input of a first RS flip-flop and the output of the negative threshold detector being connected to the R input of a second RS flip-flop, the S input of each flip-flop being connected to the output of said comparator and the output Q of each flip-flop being connected respectively to each of the two inputs of a NOR logic gate whose output constitutes said zero reset signal.

3. A control pulse generator according to claims 1 or 2, wherein said dual slope sawtooth signal generator comprises a constant voltage power supply supplying a first input of a summing circuit, and, via a controlled cutoff switch supplying a second input of said summing circuit, the output of said summing circuit being connected to the input of an integrator outputting said sawtooth signals.

* * * * *